US011920856B2

(12) United States Patent
Han et al.

(10) Patent No.: US 11,920,856 B2
(45) Date of Patent: Mar. 5, 2024

(54) REFRIGERATOR

(71) Applicant: Samsung Electronics Co., Ltd., Suwon-si (KR)

(72) Inventors: Jae Myung Han, Gwangju (KR); Jae Hoon Lim, Suwon-si (KR); Gi Joong Jeong, Gwangju (KR); Woo Yeol Yoo, Gwangju (KR); Jong Eun Chae, Gwangju (KR); Sun keun Lee, Gwangju-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 115 days.

(21) Appl. No.: 17/069,060

(22) Filed: Oct. 13, 2020

(65) Prior Publication Data

US 2021/0025644 A1 Jan. 28, 2021

Related U.S. Application Data

(63) Continuation of application No. 15/903,291, filed on Feb. 23, 2018, now Pat. No. 10,823,486, which is a (Continued)

(30) Foreign Application Priority Data

Jan. 28, 2010 (KR) ........................ 10-2010-0008028
Dec. 7, 2010 (KR) ........................ 10-2010-0124185

(51) Int. Cl.
*F25D 23/04* (2006.01)
*F25D 11/00* (2006.01)
(Continued)

(52) U.S. Cl.
CPC .............. *F25D 23/04* (2013.01); *F25D 11/00* (2013.01); *F25D 23/02* (2013.01); *F25D 23/028* (2013.01);
(Continued)

(58) Field of Classification Search
CPC ...... F25D 23/04; F25D 23/028; F25D 25/025; F25D 29/005; F25D 23/067; F25D 2400/36; F25D 2700/02
See application file for complete search history.

(56) References Cited

U.S. PATENT DOCUMENTS 3,433,889 A 3/1969 John, Jr.
3,792,189 A 2/1974 Stengel
(Continued)

FOREIGN PATENT DOCUMENTS

DE 102007029182 1/2009
JP 2-50066 2/1990
(Continued)

OTHER PUBLICATIONS

Korean Office Action dated Jul. 3, 2021 in Korean Application No. 10-2021-0018402.
(Continued)

*Primary Examiner* — Schyler S Sanks
(74) *Attorney, Agent, or Firm* — STAAS & HALSEY LLP

(57) ABSTRACT

A refrigerator includes a storage chamber having an opening; a drawer type door to open or close the opening; a display positioned at the drawer type door; a first connector provided at a sidewall of the storage chamber; a second connector provided at the drawer type door and being electrically connected to the display; a first frame coupled to an inner wall of the storage chamber, the first frame to cover the first connector; a second frame coupled to the drawer type door, the second frame to support a storage box; and a wire electrically connected between the first connector and the second connector. The first frame has a first accommodating part to accommodate one portion of the wire and the
(Continued)

second frame has a second accommodating part to accommodate another portion of the wire.

10 Claims, 13 Drawing Sheets

Related U.S. Application Data continuation of application No. 14/801,166, filed on Jul. 16, 2015, now Pat. No. 9,951,988, which is a continuation of application No. 14/541,235, filed on Nov. 14, 2014, now Pat. No. 9,115,929, which is a continuation of application No. 13/011,216, filed on Jan. 21, 2011, now Pat. No. 9,046,295.

(51) Int. Cl.
*F25D 23/02* (2006.01)
*F25D 23/06* (2006.01)
*F25D 25/02* (2006.01)
*F25D 29/00* (2006.01)
*H01R 25/00* (2006.01)

(52) U.S. Cl.
CPC ......... *F25D 23/065* (2013.01); *F25D 25/025* (2013.01); *F25D 29/005* (2013.01); *H01R 25/006* (2013.01); *F25D 23/021* (2013.01); *F25D 23/067* (2013.01); *F25D 2400/36* (2013.01); *F25D 2400/40* (2013.01); *F25D 2700/00* (2013.01); *F25D 2700/02* (2013.01)

(56) References Cited

U.S. PATENT DOCUMENTS

| | | | | |
|---|---|---|---|---|
| 5,149,017 | A | 9/1992 | McEntire | |
| 6,143,985 | A * | 11/2000 | Knapp | H04N 1/00557 174/DIG. 9 |
| 7,183,502 | B1 | 2/2007 | Johnston | |
| 7,594,707 | B2 | 9/2009 | Kunkle et al. | |
| 8,169,794 | B2 | 5/2012 | Matsukawa | |
| 9,115,929 | B2 | 8/2015 | Han | |
| 2003/0173882 | A1* | 9/2003 | Koons | A47B 88/43 312/334.7 |
| 2004/0035129 | A1 | 2/2004 | Kaiser | |
| 2006/0056165 | A1 | 3/2006 | Tsunoda | |
| 2006/0087207 | A1 | 4/2006 | Oh | |
| 2006/0087208 | A1 | 4/2006 | Oh et al. | |
| 2006/0097611 | A1* | 5/2006 | Kim | F25D 25/04 62/298 |
| 2008/0130203 | A1 | 6/2008 | Doberstein | |
| 2008/0164226 | A1 | 7/2008 | McCoy | |
| 2008/0302114 | A1 | 12/2008 | Kelly et al. | |
| 2008/0314067 | A1 | 12/2008 | Lee | |
| 2009/0102338 | A1 | 4/2009 | Wenzel et al. | |
| 2009/0229298 | A1 | 9/2009 | Allard | |
| 2009/0248207 | A1 | 10/2009 | Yoo et al. | |
| 2009/0261698 | A1 | 10/2009 | Cabal Velarde et al. | |
| 2011/0005264 | A1 | 1/2011 | Lee et al. | |
| 2011/0146333 | A1 | 6/2011 | Koo et al. | |
| 2013/0331154 | A1 | 12/2013 | Huang | |

FOREIGN PATENT DOCUMENTS

| | | |
|---|---|---|
| JP | 2000-339947 | 12/2000 |
| JP | 2004-40847 | 2/2004 |
| JP | 2008101804 | 5/2008 |
| JP | 4597221 | 10/2010 |
| KR | 20-0299890 | 1/2003 |
| KR | 10-0565695 | 3/2006 |
| KR | 10-2006-0042567 | 5/2006 |
| KR | 10-0608940 | 8/2006 |
| KR | 10-0628061 | 9/2006 |
| KR | 10-0640905 | 11/2006 |
| KR | 10-0775620 | 11/2007 |
| KR | 10-0894478 | 4/2009 |
| KR | 10-2010-0008104 A | 1/2010 |
| WO | WO2009063835 | 5/2009 |
| WO | WO2009069957 | 6/2009 |
| WO | WO2009115277 | 9/2009 |

OTHER PUBLICATIONS

European Office Action dated Jun. 15, 2021 in European Application No. 20 169 024.5-1201.
Korean Office Action dated Aug. 14, 2020 in Korean Patent Application No. 10-2020-0080689.
Extended European Search Report dated Nov. 4, 2020 in European Patent Application No. 20169024.5.
Korean Notice of Allowance dated Sep. 16, 2021 in Korean Patent Application No. 10-2021-0018402.
Extended European Search Report, dated Aug. 28, 2013, in corresponding European Application No. 11151334.7 (8 pp).
U.S. Office Action dated Feb. 5, 2014 in copending U.S. Appl. No. 13/011,216.
U.S. Office Action dated May 15, 2014 in copending U.S. Appl. No. 13/011,216.
U.S. Notice of Allowance dated Sep. 2, 2014 in copending U.S. Appl. No. 13/011,216.
U.S. Notice of Allowance dated Dec. 19, 2014 in co-pending U.S. Appl. No. 13/011,216.
U.S. Office Action dated Feb. 26, 2015 in copending U.S. Appl. No. 14/541,235.
U.S. Notice of Allowance dated May 21, 2015 in co-pending U.S. Appl. No. 14/541,235.
U.S. Office Action dated Feb. 12, 2016 in U.S. Appl. No. 14/969,595.
European Decision on Grant dated Jan. 11, 2016 in European Patent Application No. 11151334.7.
U.S. Notice of Allowance dated Jun. 17, 2016 in U.S. Appl. No. 14/969,595.
Extended European Search Report dated Aug. 11, 2016 in European Patent Application No. 16176626.6.
European Office Action dated Apr. 11, 2017 in European Patent Application No. 16176626.6.
Korean Office Action dated May 16, 2017 in Korean Patent Application No. 10-2010-0124185.
Korean Notice of Allowance dated Nov. 14, 2017 in corresponding Korean Patent Application No. 10-2010-0124185.
European Communication under Rule 71 (3)EPC dated Oct. 18, 2017 in corresponding European Patent Application No. 16 176 626.6.
U.S. Notice of Allowance dated Nov. 27, 2017 in U.S. Appl. No. 14/801,166.
U.S. Office Action dated Feb. 9, 2017 in U.S. Appl. No. 14/801,166.
Korean Office Action dated Mar. 19, 2018 in Korean Patent Application No. 10-2018-0018507.
Korean Office Action dated Sep. 10, 2018 in Korean Patent Application No. 10-2018-0018507.
Korean Notice of Allowance dated Nov. 12, 2018 in Korean Patent Application No. 10-2018-0018507.
Korean Office Action dated Mar. 4, 2019 in Korean Patent Application No. 10-2019-0016189.
Korean Notice of Allowance dated Sep. 22, 2019 in Korean Patent Application No. 10-2019-0016189.
Korean Office Action dated Dec. 10, 2019 in Korean Patent Application No. 10-2019-0137218.
U.S. Office Action dated Apr. 19, 2019 in U.S. Appl. No. 15/903,291.
U.S. Office Action dated Nov. 21, 2019 in U.S. Appl. No. 15/903,291.
U.S. Notice of Allowance dated Mar. 4, 2020 in U.S. Appl. No. 15/903,291.
U.S. Notice of Allowance dated Jun. 24, 2020 in U.S. Appl. No. 15/903,291.
U.S. Appl. No. 15/903,291, filed Feb. 23, 2018, Jae Myung Han, et al., Samsung Electronics Co., Ltd.
U.S. Appl. No. 14/801,166 (now U.S. Pat. No. 9,951,988), filed Jul. 16, 2015, Jae Myung Han, et al., Samsung Electronics Co., Ltd.

(56) References Cited

OTHER PUBLICATIONS

U.S. Appl. No. 14/541,235 (now U.S. Pat. No. 9,115,929), filed Nov. 14, 2014, Jae Myung Han, et al., Samsung Electronics Co., Ltd.
U.S. Appl. No. 13/011,216, filed Jan. 21, 2011, Jae Myung Han, et al., Samsung Electronics Co., Ltd.
U.S. Appl. No. 14/969,595 (now U.S. Pat. No. 9,523,531), filed Dec. 15, 2015, Jae Myung Han, et al., Samsung Electronics Co., Ltd.
European Office Action dated Jul. 18, 2022 in European Patent Application No. 20 169 024.5 (10 pages).
European Office Action dated Mar. 15, 2023 in European Patent Application No. 20 169 024.5 (10 pages).
Office Action dated Nov. 7, 2023 in European Patent Application No. 20 169 024.5.

* cited by examiner

REFRIGERATOR

CROSS-REFERENCE TO RELATED APPLICATIONS

This application is a continuation application of U.S. application Ser. No. 15/903,291 filed Feb. 23, 2018, which is a continuation application of U.S. application Ser. No. 14/801,166 filed Jul. 16, 2015, which is a continuation application of U.S. application Ser. No. 14/541,235 filed Nov. 14, 2014, which issued as U.S. Pat. No. 9,115,929 on Aug. 25, 2015, which is a continuation application of U.S. application Ser. No. 13/011,216 filed Jan. 21, 2011, which issued as U.S. Pat. No. 9,046,295 on Jun. 2, 2015, which claims the priority benefit of Korean Patent Application No. 10-2010-0008028, filed on Jan. 28, 2010, and Korean Patent Application No. 10-2010-0124185, filed on Dec. 7, 2010, in the Korean Intellectual Property Office, the disclosures of which are incorporated herein by reference.

BACKGROUND

1. Field

Embodiments relate to a refrigerator having a connection structure of an electric wire cable connected to a control panel provided at the front of a drawer type door.

2. Description of the Related Art

Generally, a refrigerator is an apparatus that supplies low-temperature cool air into a storage chamber to store food in a fresh state in the storage chamber at low temperature. The refrigerator may include a freezing chamber to store food at below freezing temperature and a refrigerating chamber to store food at a temperature slightly higher than freezing temperature.

In recent years, various kinds of refrigerators manufactured in consideration of convenience and storage spaces have come onto the market. The refrigerators may be classified into general refrigerators each having a freezing chamber provided at the upper part thereof, side-by-side refrigerators each having a freezing chamber provided at one side thereof, and combination refrigerators each having a freezing chamber provided at the lower part thereof.

A combination refrigerator has been disclosed wherein a freezing chamber door is slid in the frontward-and-rearward of a refrigerator body to open and close a freezing chamber, and the freezing chamber door is provided with a control panel to set temperature conditions of the freezing chamber.

The control panel is connected to an electric wire cable drawn from an inner liner of the refrigerator body, and therefore, a structure to prevent the electric wire cable from being damaged due to interference with the surroundings upon sliding insertion and drawing of the freezing chamber door is adopted.

SUMMARY

It is an aspect of the present embodiments to provide a refrigerator to protect an electric wire cable connected to a control panel provided at a drawer type door.

Additional aspects will be set forth in part in the description which follows and, in part, will be obvious from the description, or may be learned by practice of the invention.

In accordance with one aspect, a refrigerator includes a storage chamber open at one side thereof, the storage chamber having an electric wire drawing part formed at one sidewall disposed adjacent to the opening thereof, a drawer type door to open and close the storage chamber, the drawer type door having a control panel, sliding frames extending from opposite sides of a rear of the drawer type door such that the sliding frames are slidably coupled to the storage chamber, the sliding frames being configured to support a storage box, an electric wire cable, for electrical connection with the control panel, including a first length part having one side connected to the electric wire drawing part and extending toward a rear wall of the storage chamber and a second length part having the other side bent at an end of the first length part and extending toward the opening of the storage chamber such that the second length part is connected to the control panel, fixed frames to which the sliding frames are movably coupled, one of the fixed frames being fixed to one sidewall of the storage chamber to define a receiving space to receive the electric wire cable, one of the fixed frames having a guide hole through which the second length part of the electric wire cable is exposed, an electric wire cable housing coupled to a corresponding one of the sliding frames, the electric wire cable housing having a receiving part to receive at least a portion of the second length part exposed from the receiving space, and a push member provided at a corresponding one of the sliding frames to push a portion of the electric wire cable exposed through the guide hole into the receiving space upon movement of the sliding frames.

The electric wire cable housing may have a length corresponding to a length of the corresponding one of the sliding frames and may be disposed such that the electric wire cable housing faces the guide hole.

The refrigerator may further include a guide part bent and extending from an end of the electric wire cable housing such that the guide part is inserted into the guide hole, the guide part being moved along the guide hole.

The corresponding one of the fixed frames defining the receiving space may be provided at one side with a support plane to support a front end of the first length part such that the first length part of the electric wire cable is disposed at an upper part of the receiving space.

The refrigerator may further include a fixing part to prevent the first length part from being separated from the support plane, and a rear end of the first length part may be disposed in the receiving space such that the rear end of the first length part is freely moved.

The push member may include a tight contact part disposed opposite to the guide hole in a tight contact state and a bent pressing part to press the electric wire cable protruding from the guide hole.

The refrigerator may further include sliding units mounted between the fixed frames and the sliding frames.

The electric wire cable may be provided at opposite ends thereof with connectors, the connectors being coupled to a first connector provided at the electric wire drawing part and a second connector provided at the drawer type door.

The second connector may be prevented from being exposed outward by the storage box located at the sliding frames in a supported state.

The refrigerator may further include an opening and closing detection unit to detect an open or closed state of the drawer type door, and the opening and closing detection unit may include a reed switch provided at a corresponding one of the fixed frames adjacent to the electric wire drawing part and a magnet provided at a corresponding one of the sliding frames such that the magnet cooperates with the reed switch.

The reed switch may be electrically connected to an electric wire drawn through the electric wire drawing part.

In accordance with one aspect, a refrigerator includes a refrigerator body having a storage chamber open at one side thereof, the storage chamber having a first connector provided at one sidewall disposed adjacent to the opening thereof, a drawer type door slidably provided to open and close the opening, the drawer type door having sliding frames to support a storage box, a control panel provided at the drawer type door, a second connector provided at one side of a rear of the drawer type door, the second connector being electrically connected to the control panel, an electric wire cable to electrically connect the first connector and the second connector, a fixed frame coupled to each sidewall of the storage chamber to define a receiving space to receive the electric wire cable, the electric wire cable including a first length part extending from one end thereof coupled to the first connector to the vicinity of a rear wall of the storage chamber and a second length part bent at the other end of the first length part and extending to the vicinity of the opening of the storage chamber such that the second length part is coupled to the second connector, and an electric wire cable housing coupled to a corresponding of the sliding frames, the electric wire cable housing having a receiving part to receive at least a portion of the second length part.

The receiving space may be provided at one side thereof with a support plane to support a front end of the first length part and a fixing part to prevent the first length part from being separated from the support frame.

A rear end of the first length part may be disposed in the receiving space such that the rear end of the first length part is freely moved, and the rear end of the first length part may be deformed upon movement of the drawer type door.

The fixed frame having the receiving space may have a guide hole cut in a direction in which the sliding frames are moved, and at least a portion of the second length part may protrude through the guide hole and may be received in the electric wire cable housing.

The electric wire cable housing may be provided at an end thereof with a guide part extending to the guide hole such that the guide part is inserted into the guide hole.

A corresponding one of the sliding frames may be provided with a push member to push the electric wire cable protruding through the guide hole upon drawing of the sliding frames such that the protruding electric wire cable is returned into the receiving space.

The push member may include a fixing part fixed to a rear end of a corresponding one of the sliding frames, a tight contact part extending from the fixing part such that the tight contact part tightly contacts the guide hole, and a bent pressing part provided at an end of the tight contact part.

The electric wire cable housing may have a length corresponding to a length of a corresponding one of the sliding frames, one side of the receiving part may be open such that the electric wire cable is inserted into or drawn from the receiving part through the opening, and the electric wire cable housing may be detachably coupled to the corresponding one of the sliding frames.

The opening of the receiving part may face the inside of the storage chamber to prevent the electric wire cable received in the receiving part from being exposed upon drawing of the sliding frames.

The refrigerator may further include sliding units mounted between the fixed frames and the sliding frames such that the sliding frames are slid with respect to the respective fixed frames via the sliding units.

In accordance with another aspect, a refrigerator having a drawer-type drawer, a storage chamber having at least one sidewall, and an electric wire cable, includes a fixed frame in which the electric wire cable drawn from the at least one sidewall of the storage camber forms a loop, a sliding frame slidably coupled to the fixed frame, and an electric wire cable housing fixed to the sliding frame to surround a portion of the electric wire cable.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
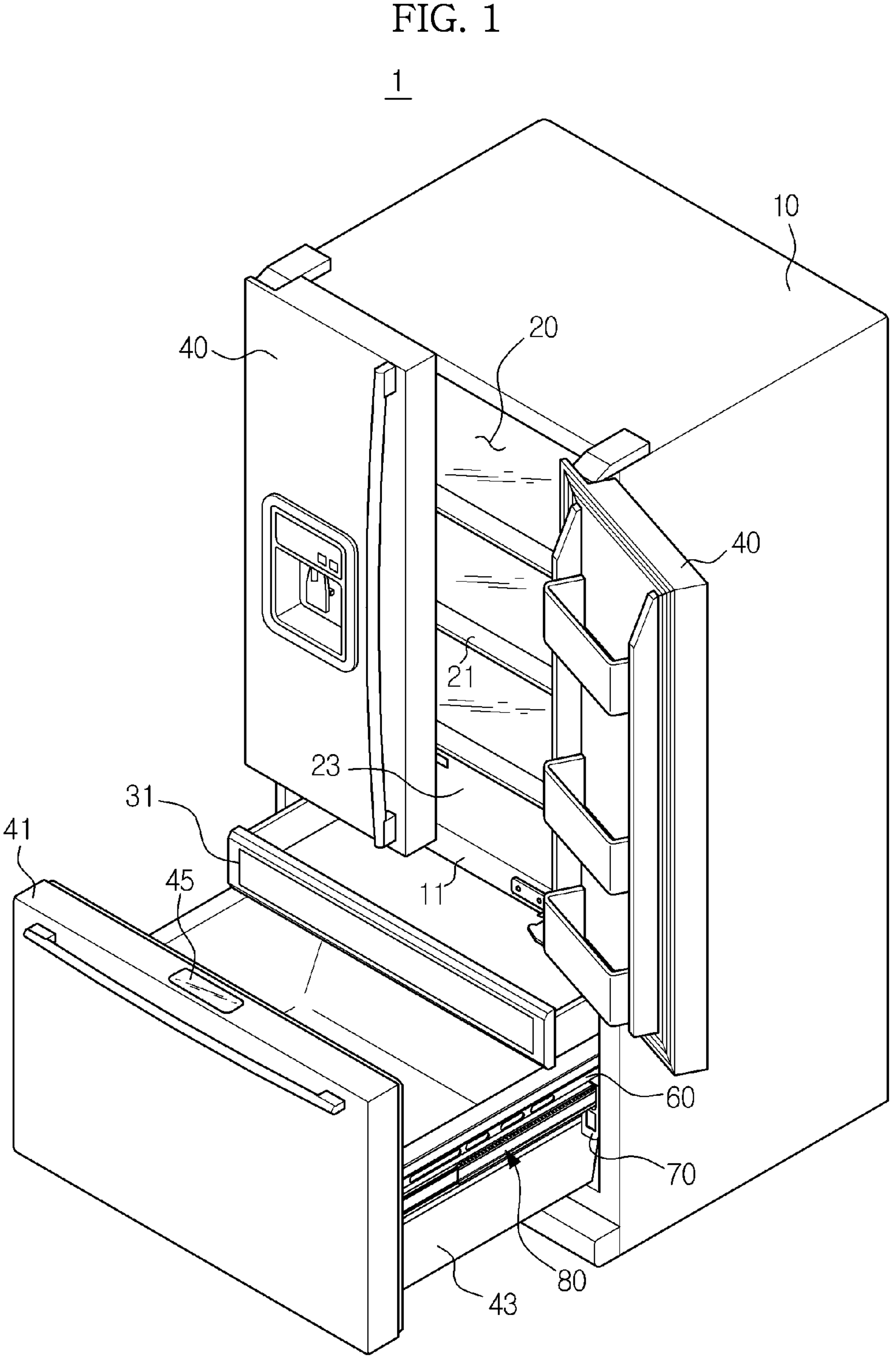
FIG. 1 is a perspective view schematically illustrating the external appearance of a refrigerator according to an embodiment.

Reference will now be made in detail to the embodiments, examples of which are illustrated in the accompanying drawings, wherein like reference numerals refer to like elements throughout.

Figure 2:
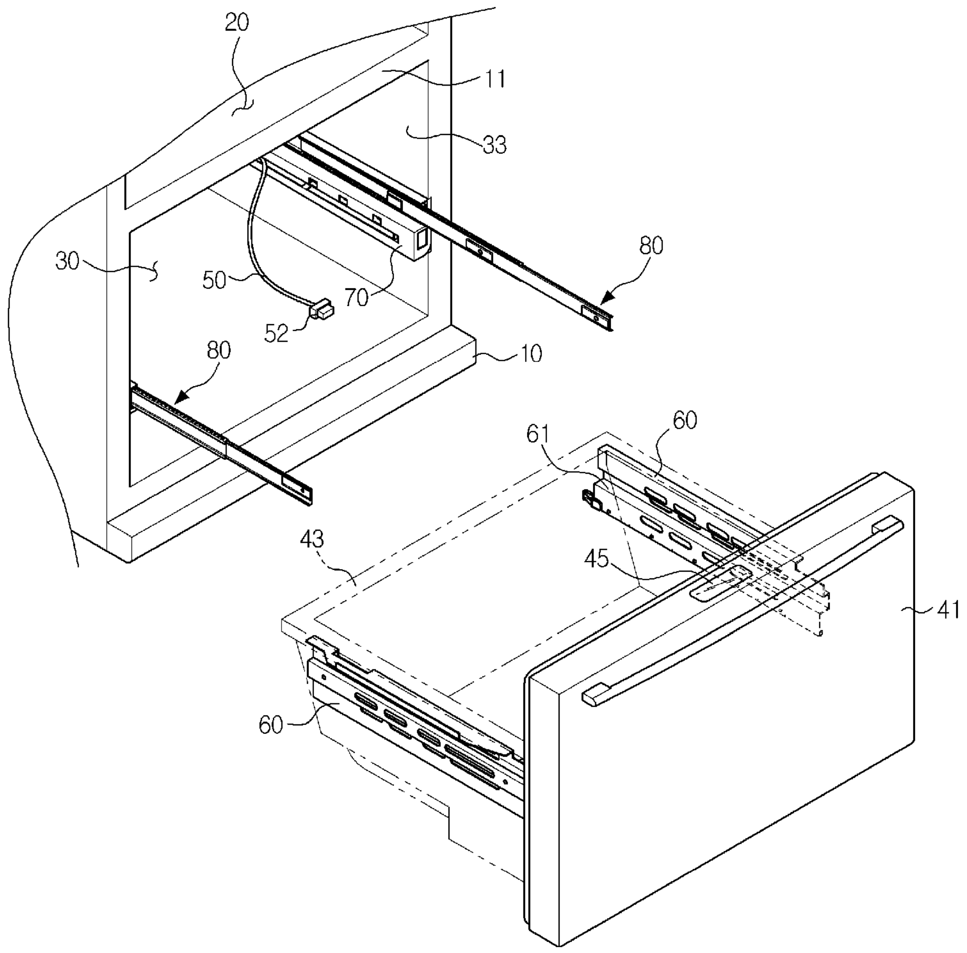
FIG. 2 is an exploded perspective view illustrating a freezing chamber of the refrigerator.
Figure 3:
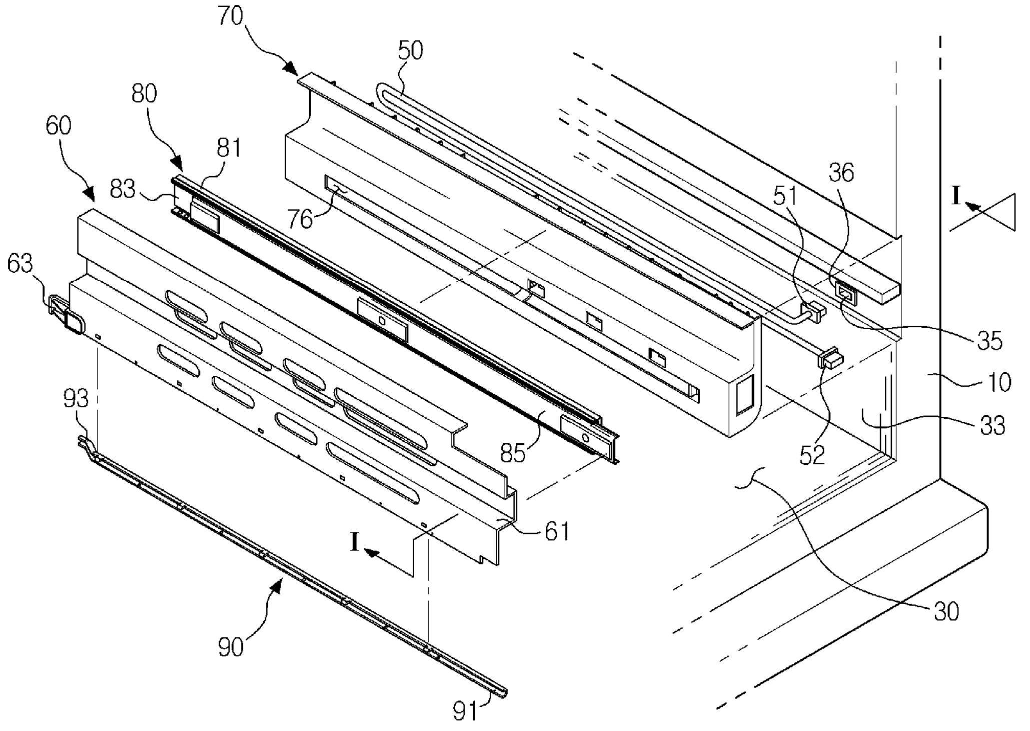
FIG. 3 is an exploded perspective view illustrating a principal part of the refrigerator.
Figure 4:
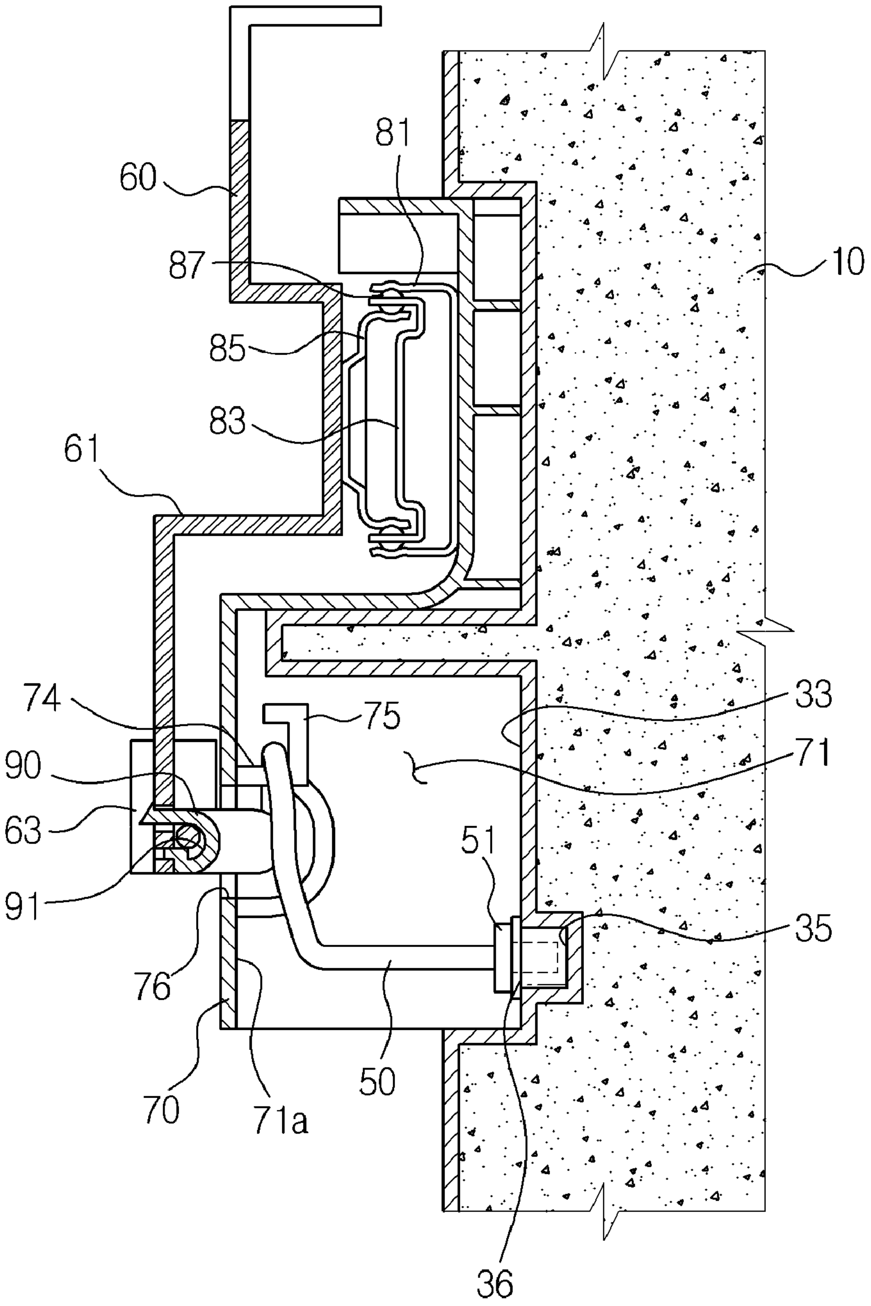
FIG. 4 is a sectional view taken along line I-I of FIG. 3.

FIG. 1 is a perspective view schematically illustrating the external appearance of a refrigerator 1 according to an embodiment. FIG. 2 is an exploded perspective view illustrating a freezing chamber 30 of the refrigerator 1. FIG. 3 is an exploded perspective view illustrating a principal part of the refrigerator 1. FIG. 4 is a sectional view taken along line I-I of FIG. 3.

Referring to FIG. 1, the refrigerator 1 may include a refrigerator body 10, storage chambers 20 and 30 vertically partitioned in the refrigerator body 10. The storage chambers 20 and 30 may have open fronts, and doors 40 and 41 to open and close the open fronts of the storage chambers 20 and 30.

The storage chambers 20 and 30 may be vertically partitioned by a horizontal partition 11. Above the horizontal partition 11 may be located a refrigerating chamber 20 to store food in a refrigerated state. Below the horizontal partition 11 may be located a freezing chamber 30 to store food in a frozen state.

At the upper part of the refrigerating chamber 20 may be provided a plurality of shelves 21 on which food may be placed. At the lower part of the refrigerating chamber 20 may be provided a drawer type storage container 23 to store food, such as vegetables, moisture evaporation from which is to be restrained.

At the upper part of the freezing chamber 30 may be provided a sliding storage basket 31 to store food in a frozen state.

The doors 40 and 41 may include refrigerating chamber doors 40 to open and close the refrigerating chamber 20 and a freezing chamber door 41 to open and close the freezing chamber 30.

The freezing chamber door 41 may be configured in a drawer type structure in which the freezing chamber door 41 is slidably drawn from and inserted into the freezing chamber 30 to open and close the freezing chamber 30. The refrigerating chamber doors 40 may be hingedly coupled to opposite sides of the refrigerator body 10.

A storage box 43 may be integrally or detachably mounted to the freezing chamber door 41 such that, when the freezing chamber door 41 is opened, the storage box 43 is exposed such that a user may easily put food in the storage box 43 or withdraw food from the storage box 43.

At one side of the top of the freezing chamber door 41 may be provided a control panel 45 including manipulation buttons to allow the user to manipulate functions of the freezing chamber 30 and a display to display the operation of the freezing chamber 30.

Referring to FIG. 2, sliding frames 60 may be provided at opposite sides of the rear of the freezing chamber door 41 such that the sliding frames 60 extend rearward to support the storage box 43. The sliding frames 60 may be coupled to sliding units 80 provided at opposite sidewalls of the freezing chamber 30.

Also, fixed frames 70 may be provided at sidewalls 33 of the freezing chamber 30 such that an electric wire cable 50 electrically connected to the control panel 45 of the freezing chamber door 41 is received in a corresponding one of the fixed frames 70. The sliding units 80 may be coupled to the respective fixed frames 70.

Referring to FIGS. 3 to 4, the electric wire cable 50 electrically connected to the control panel 45 may be drawn from an electric wire drawing part 35 provided at one of the sidewalls 33 of the freezing chamber 30.

The electric wire drawing part 35 may be disposed adjacent to the front opening of the freezing chamber 30 at one of the sidewalls 33 of the freezing chamber 30.

The electric wire cable 50 may be longer than the maximum opening length of the freezing chamber door 41. In an embodiment, the electric wire cable 50 may have a length sufficient to extend from the electric wire drawing part 35 to the rear end of the freezing chamber 30 and from the rear end to the front end of the freezing chamber 30.

Also, the electric wire cable 50 may be provided at opposite ends thereof with connectors 51 and 52 for electrical connection.

Figure 9:
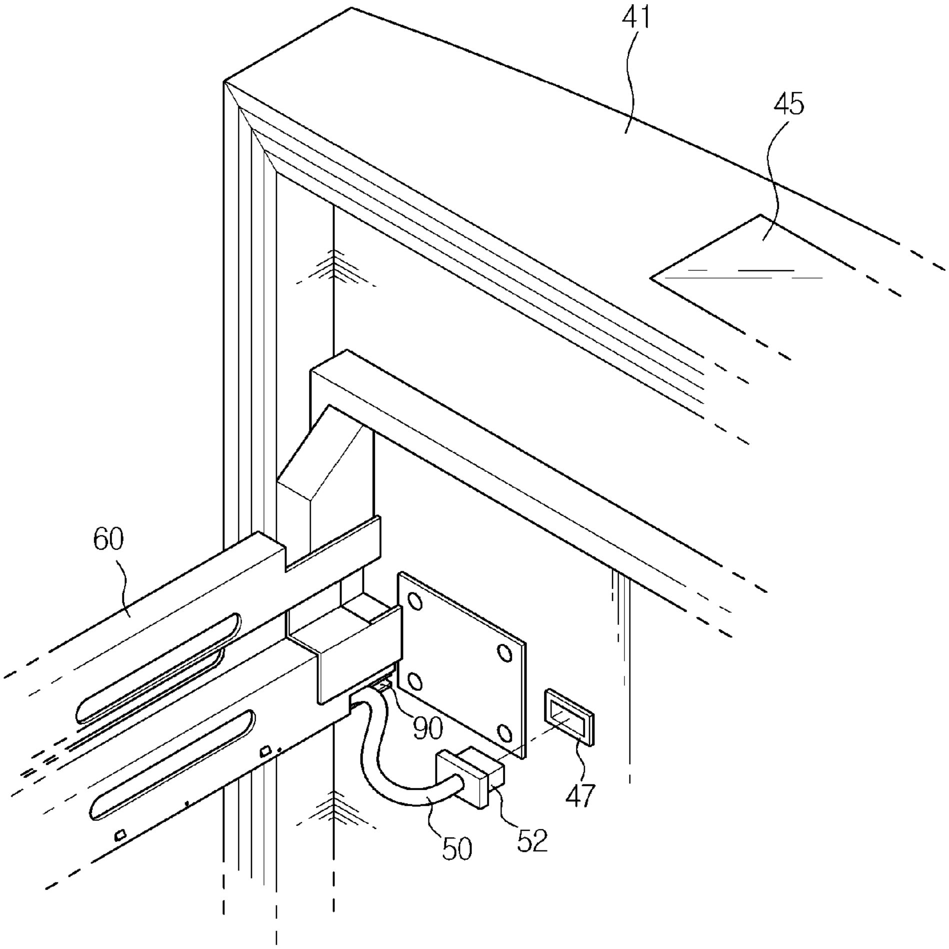
FIG. 9 is a partial view illustrating the rear of the freezing chamber door.

The first connector 51 provided at one end of the electric wire cable 50 may be coupled to a first connector 36 provided at the electric wire drawing part 35 formed at one of the sidewalls 33 of the freezing chamber door 41, and the second connector 52 provided at the other end of the electric wire cable 50 may be coupled to a second connector 47 formed at the rear of the freezing chamber door 41 as shown in FIG. 9. The second connector 47 may be electrically connected to the control panel 45.

The second connector 47 exposed from the rear of the freezing chamber door 41 is hidden by the storage box 43 located at a location part 61 of a corresponding one of the sliding frames 60 such that the second connector 47 is not exposed outward.

The sliding frames 60 may be slidably provided at the corresponding fixed frames 70. Specifically, the sliding frames 60 may be slidably provided at the corresponding fixed frames 70 via the sliding units 80 for stable movement thereof.

Each of the sliding units 80 may include a first rail 81 provided at the corresponding fixed frame 70, a second rail 83, having a width sufficient to be received in the first rail 81, provided to move relative to the first rail 81, and a third rail 85, having a width sufficient to be received in the second rail 83, provided at the corresponding sliding frame 60 to move relative to the second rail 83. That is, each of the sliding units 80 may be configured in a three-stage rail structure.

Also, bearings 87 to assist easy movement of the drawer type freezing chamber door 41 may be provided between the rails 81, 83 and 85 of each of the sliding units 80.

In this embodiment, each of the sliding units 80 is configured in the three-stage rail structure to increase the maximum opening length of the freezing chamber door 41. Alternatively, a general two-stage rail structure may be adopted, or rollers, which perform rolling motion, may be used.

In this embodiment, the fixed frames 70 and the sliding frames may have a structure to prevent the electric wire cable 50 from being damaged due to interference with the surroundings when the freezing chamber door 41 is inserted into and drawn from the freezing chamber 30.

Each of the fixed frames 70 may extend in the frontward-and-rearward direction of the freezing chamber 30. Each of the fixed frames 70 may be fixed to the sidewall 33 of the freezing chamber 30. One side of a corresponding one of the fixed frames 70 may be open such that a space to receive the electric wire cable 50 is defined in the corresponding one of the fixed frames 70. As a result, a receiving space 71 (refer to FIG. 4) to receive the electric wire cable 50 drawn from the electric wire drawing part 35 may be provided between the sidewall 33 of the freezing chamber 30 and the corresponding one of the fixed frames 70.

The electric wire cable 50 disposed in the receiving space 71 may extend toward the rear of the freezing chamber 30 from a part thereof coupled to the first connector 36, may be bent, and may extent toward the front of the freezing chamber 30.

In this case, a portion of the electric wire cable 50 extending toward the rear of the freezing chamber 30 may be fixedly supported by a support plane 74 formed at one side of the receiving space 71, and the remaining portion of the electric wire cable 50 may be disposed in the receiving space 71 in a non-contact state.

Also, the electric wire cable 50 extending toward the front of the freezing chamber 30 may extrude from the receiving space 71 such that the electric wire cable 50 is fixedly received in an electric wire cable housing 90 coupled to a corresponding one of the sliding frame 60.

Figure 5:
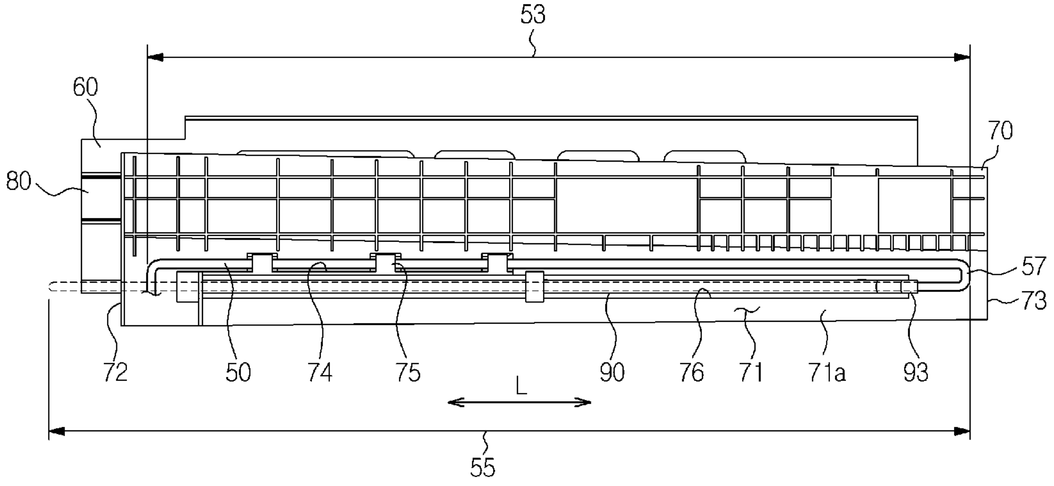
FIG. 5 is a side view illustrating an electric wire cable disposed in a fixed frame of the refrigerator.
Figure 6:
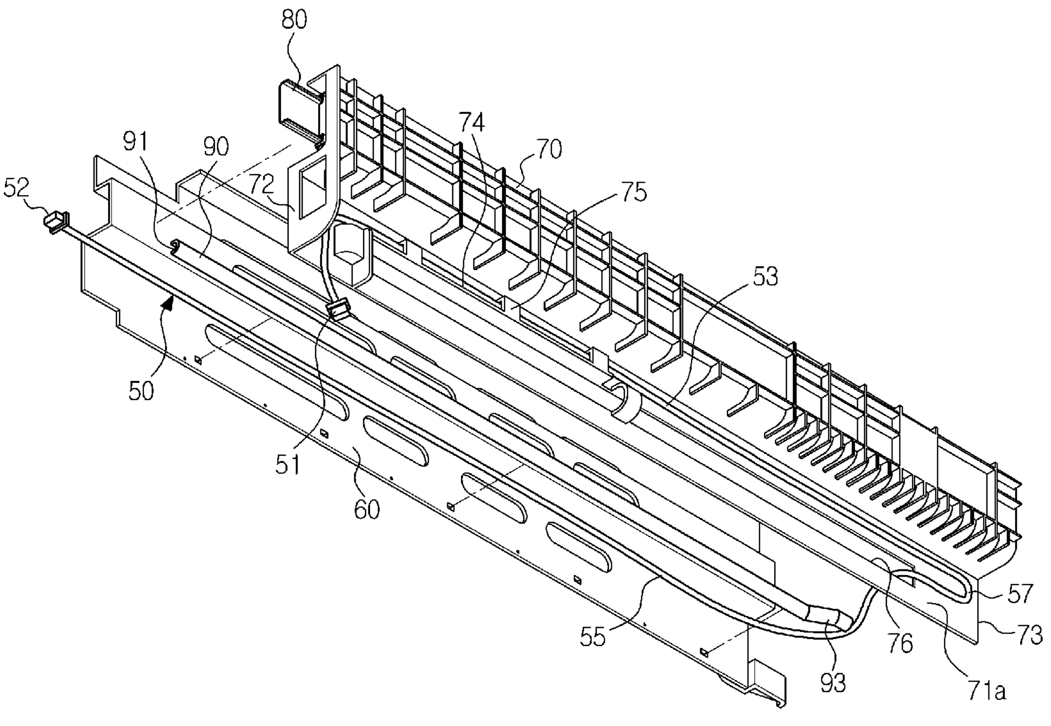
FIG. 6 is an exploded perspective view illustrating a coupling structure of the electric wire cable disposed in the refrigerator.
Figure 7:
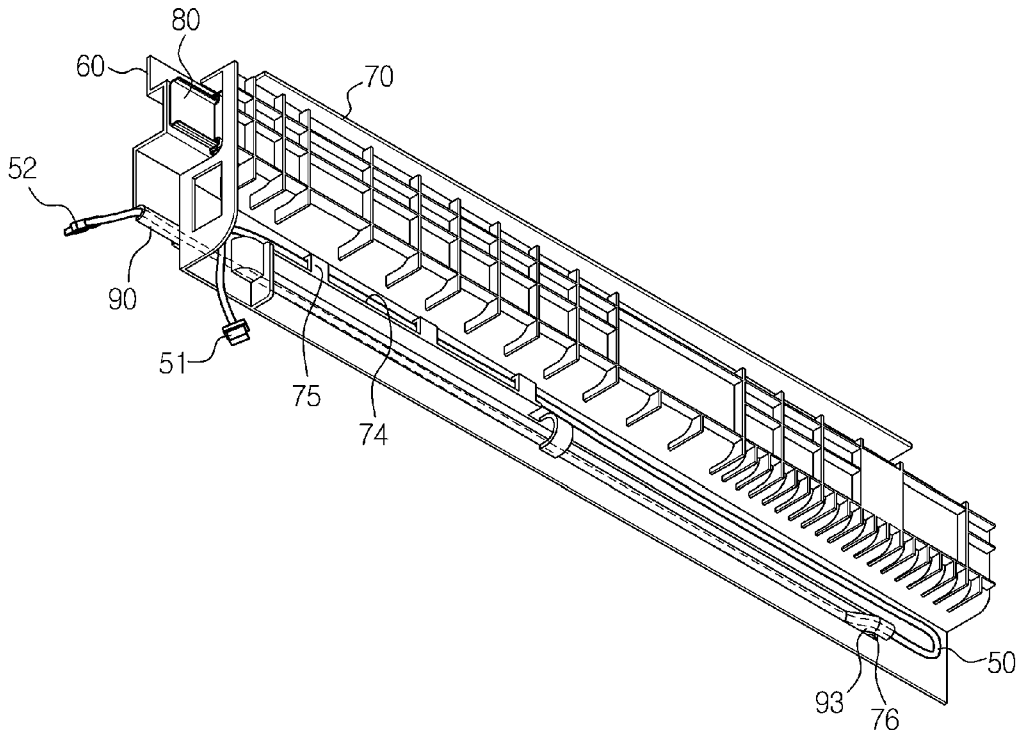
FIG. 7 is a perspective view illustrating the electric wire cable coupled to the fixed frame of the refrigerator.

That is, referring to FIGS. 5 to 7, the corresponding fixed frame 70 having the receiving space 71 may be provided at one side 71*a* thereof with a support plane 74 extending outward, and the support plane 74 may extend a predetermined length in a longitudinal direction L thereof from the front upper side of the receiving space 71.

Also, the corresponding fixed frame 70 having the receiving space 71 may be provided at the lower part of the side 71*a* thereof with a guide hole 76 cut in the longitudinal direction L thereof such that one end of the electric wire cable housing 90 is inserted into the guide hole 76.

One side of the electric wire cable housing 90 may be open such that the electric wire cable 50 is inserted into the electric wire cable housing 90. The electric wire cable housing 90 may extend in the longitudinal direction L thereof, The electric wire cable housing 90 may detachably coupled to the lower end of a corresponding one of the sliding frames 60.

The electric wire cable 50 received in the receiving space 71 may include a first length part 53 extending from the connector 51 coupled to the first connector 36 to the other end 73 of the corresponding fixed frame 70 in the longitudinal direction L thereof, a bend part 57 bent at the end of the first length part 53, and a second length part 55 extending from the end of the bend part 57 to one end 72 of the corresponding fixed frame 70, which is opposite to the other end 73 of the corresponding fixed frame 70.

The electric wire cable 50 may be provided in the receiving space 71 of the corresponding fixed frame 70 such that the length of the electric wire cable 50 changes according to change in drawn length of the freezing chamber door 41 when the freezing chamber door 41 is drawn out.

That is, the electric wire cable 50 disposed in the receiving space 71 may be provided between one end 72 of the corresponding fixed frame 70 adjacent to the opening of the freezing chamber 30 and the other end 73 of the corresponding fixed frame 70 adjacent to the rear wall of the freezing chamber 30 such that the electric wire cable 50 forms a loop.

In this case, the first length part 53 of the electric wire cable 50 may be disposed at the upper part of the receiving space 71, and the second length part 55 of the electric wire cable 50 may be disposed at the lower part of the receiving space 71 such that the first length part 53 and the second length part 55 are separated from each other. That is, the receiving space 71 is divided into an upper receiving space 71 and a lower receiving space 71 by the support plane 74.

The front end of the first length part 53 disposed at the upper part of receiving space 71 may be located at the support plane 74 in a supported state, and the rear end of the first length part 53 may be disposed in the receiving space 71 in a freely movable state such that the shape of the rear end of the first length part 53 is deformed in correspondence to the drawn distance of the freezing chamber door 41.

Meanwhile, the support plane 74 may be provided with a fixing part 75 to prevent the front end of the first length part 53 of the electric wire cable 50 located at the support place 74 in the supported state from being separated from the support place 74 when the rear end of the first length part 53 of the electric wire cable 50 is deformed.

The fixing part 75 may include a plurality of hooks extending from one side of the support plane 74 to surround the outer circumference of the front end of the first length part 53. The fixing part 75 may serve to fix the front end of the first length part 53 to the support plane 74.

The second length part 55 disposed at the lower part of the receiving space 71 may be received in the electric wire cable housing 90 in a supported state such that the shape of the second length part 55 is not freely deformed.

To this end, the electric wire cable housing 90 may be provided with a receiving part 91 open at one side thereof to receive at least a portion of the second length part 55. The second length part 55 of the electric wire cable 50 may fixedly inserted in to the receiving part 91 through an opening of the receiving part 91 via the guide hole 76.

That is, as shown in FIG. 7, the second length part 55 of the electric wire cable 50 is fixedly inserted into the receiving part 91 of the electric wire cable housing 90 through the opening of the receiving part 91, and the connector 52 provided at the end of the second length part 55 protrudes from the electric wire cable housing 90 such that the connector 52 is coupled to the second connector 47 provided at the rear of the freezing chamber door 41.

Consequently, the second length part 55 of the electric wire cable 50 is fixedly located in the receiving part 91, with the result that the shape of the second length part 55 is prevented from being deformed upon insertion and drawing of the freezing chamber door 41.

Meanwhile, the opening of the electric wire cable housing 90 may be disposed in the inward direction of the freezing chamber 30 to prevent the electric wire cable 50 from being exposed from the corresponding sliding frame 60 drawn together with the freezing chamber door 41.

Figure 12:
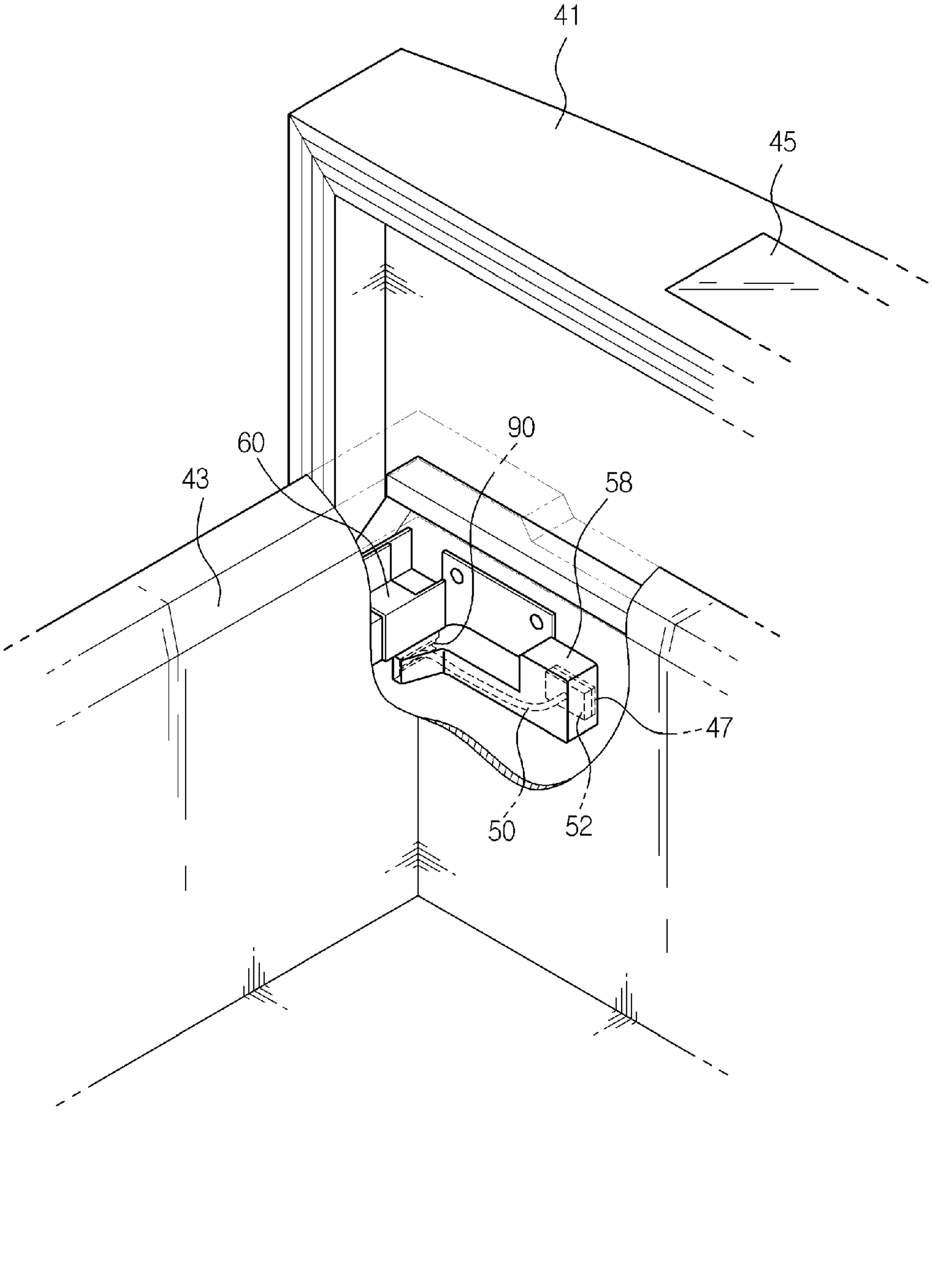
FIG. 12 is a view illustrating a connector coupling structure at the rear of the freezing chamber door.

When the storage box 43 is located at the sliding frames 60, therefore, as shown in FIG. 12, the opening of the electric wire cable housing 90 faces the side of the storage box 43 such that the opening of the electric wire cable housing 90 is covered by the storage box 43. Consequently, the second length part 55 of the electric wire cable 50 is prevented from being exposed outward, thereby improving aesthetic appearance. Also, a connector cover 59 may be mounted at the rear of the freezing chamber door 41 to prevent the connector 52 and the second length part 55 protruding from the electric wire cable housing 90 from being exposed outward.

The electric wire cable housing 90 may prevent the electric wire cable 50 from being exposed upon drawing of the freezing chamber door 41 and guide the electric wire cable 50 such that the electric wire cable 50 is arranged at the original position in the receiving space 71 upon insertion of the freezing chamber door 41.

The electric wire cable housing 90 may be integrally or detachably provided at the lower part of the corresponding sliding frame 60 such that the electric wire cable housing 90 moves simultaneously with the corresponding sliding frame 60 upon movement of the corresponding sliding frame 60.

In this case, the electric wire cable housing 90 may be disposed such that the electric wire cable housing 90 faces the guide hole 76 formed at the corresponding fixed frame 70, and the end of the electric wire cable housing 90 adjacent to the bent part 57 of the electric wire cable 50 may be provided with a guide part 93 configured to be movable along the guide hole 76.

The guide part 93 may be bent and extend from the end of the electric wire cable housing 90 toward the guide hole 76 such that the guide part 93 is inserted into the guide hole 76. The guide part 93 bent and extending toward the guide hole 76 serves to guide the electric wire cable 50 such that the electric wire cable 50 is deformed and moved only in the receiving space 71.

Figure 8:
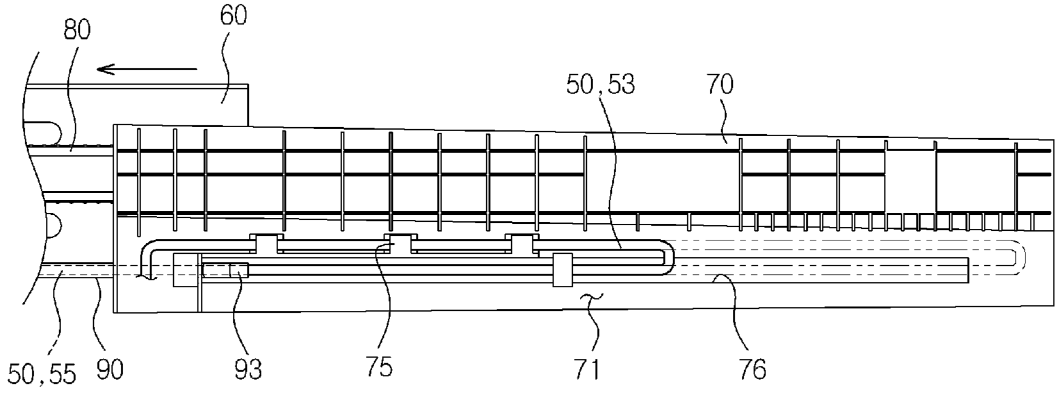
FIG. 8 is a view illustrating the operation of the electric wire cable when a freezing chamber door according to an embodiment is drawn out.

In this embodiment, interference between the electric wire cable 50 and the surroundings is avoided, when the freezing chamber door 41 is drawn out and inserted into the freezing chamber 30, thereby preventing damage to the electric wire cable 50. That is, when the freezing chamber door 41 is drawn out, as shown in FIG. 8, the corresponding sliding frame 60 fixed to the freezing chamber door 41 and the electric wire cable housing 90 fixed to the corresponding sliding frame 60 are also slid and drawn frontward.

In this embodiment, the second length part 55 of the electric wire cable 50 connected to the second connector 47 provided at the rear of the freezing chamber door 41 is pulled frontward, with the result that the first length part 53 of the electric wire cable 50 disposed at the rear of the receiving space 71 such that the first length part 53 is not fixed to the corresponding fixed frame 70 but freely deformed is moved frontward while being deformed by a drawn length thereof.

That is, the front end of the first length part 53 of the electric wire cable 50 located at the support plane 74 is fixed by the fixing part 75, with the result that the front end of the first length part 53 of the electric wire cable 50 does not move upon drawing of the freezing chamber door 41. However, the rear end (imaginary part) of the first length part 53 of the electric wire cable 50 disposed at the rear of the support plane 74 is deformed by the drawn distance of the freezing chamber door 41 and moved in the longitudinal direction L thereof upon drawing of the freezing chamber door 41.

At this time, the second length part 55 of the electric wire cable 50 drawn frontward is received in the electric wire cable housing 90, and therefore, the second length part 55 is not exposed to the outside, and, at the same time, damage to the second length part 55 due to interference with a surrounding structure is prevented.

Also, when the freezing chamber door 41 is inserted into the freezing chamber 30, the electric wire cable housing 90 guides the electric wire cable 50 disposed in the receiving space 71 according to a predetermined motion pattern such that the electric wire cable 50 is moved to the original position (shown by an imaginary line) in the receiving space 71.

In this embodiment, the deforming portion of the electric wire cable 50 is guided by the guide part 93 such that the deforming portion of the electric wire cable 50 is moved in the receiving space 71 from the end of the electric wire cable housing 90 toward the inside of the receiving space 71.

Figure 10:
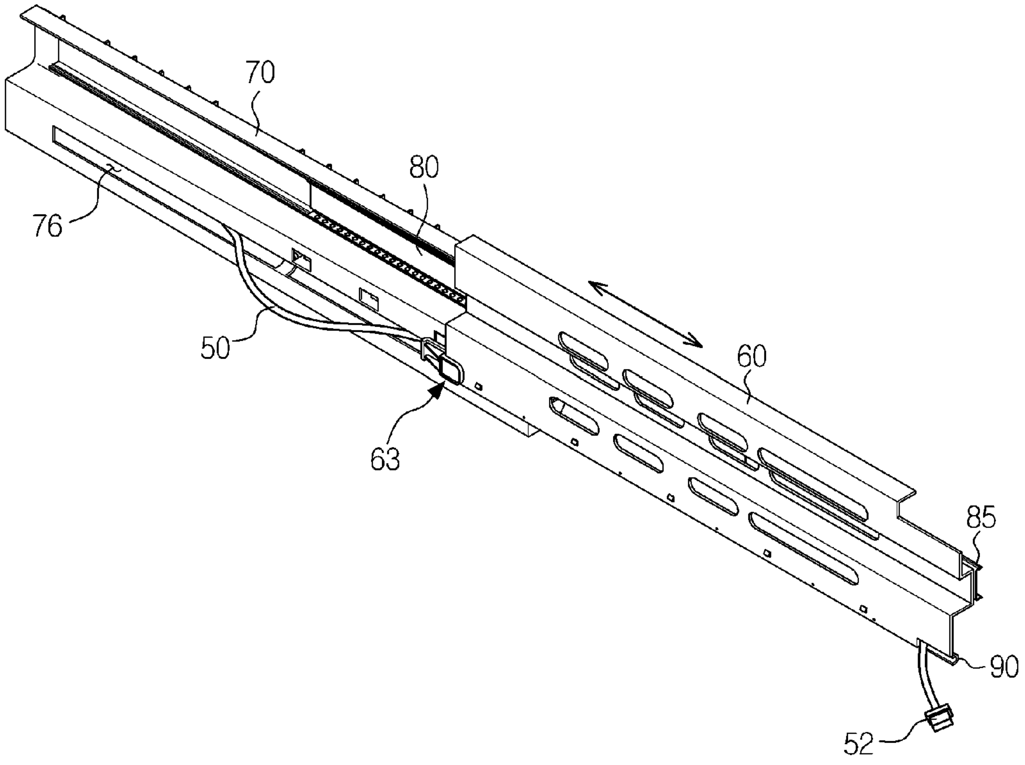
FIG. 10 is a perspective view illustrating the electric wire cable protruding out of a guide hole of the fixed frame according to an embodiment.

Meanwhile, during the deformation of the electric wire cable 50 disposed in the receiving space 71 upon drawing and insertion of the freezing chamber door 41, as shown in FIG. 10, the electric wire cable 50 may protrude out of the guide hole 76, with the result that the electric wire cable 50 may be bent or damaged due to interference with the surroundings.

To prevent the electric wire cable 50 from being bent or damaged, the corresponding sliding frame 60 may be provided at the lower part of the rear end thereof with a push member 63.

Figure 11:
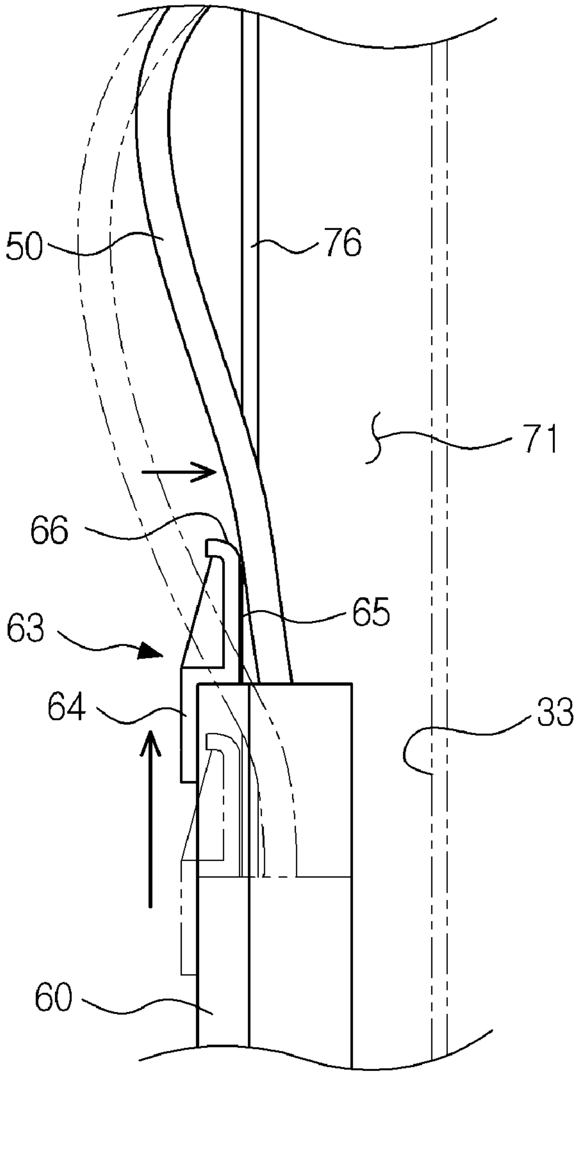
FIG. 11 is a sectional view illustrating the operation of a push member according to an embodiment.

As shown in FIG. 11, the push member 63 may press the electric wire cable 50 protruding out of the guide hole 76 to push the protruding portion of the electric wire cable 50 in a contact state into the receiving space 71 inside the guide hole 76.

To this end, the push member 63 may include a fixing part 64 fixed to the corresponding sliding frame 60, a tight contact part 65 extending from the fixing part 64 such that the tight contact part 65 tightly contacts the guide hole 76, and a pressing part 66 provided at one end of the tight contact part 65 to contact the electric wire cable 50 protruding out of the guide hole 76.

The tight contact part 65 may be disposed adjacent to the guide hole 76 such that the tight contact part 65 faces the guide part 93 of the electric wire cable housing 90.

The pressing part 66 presses the electric wire cable 50 protruding out of the guide hole 76 to guide the protruding portion of the electric wire cable 50 into the receiving space 71. The pressing part 66 may be bent to prevent damage to the electric wire cable 50 due to contact.

Meanwhile, in this embodiment, the refrigerator may further include an opening and closing detection unit 95 and 96 to detect an open or closed state of the freezing chamber door 41.

Figure 13:
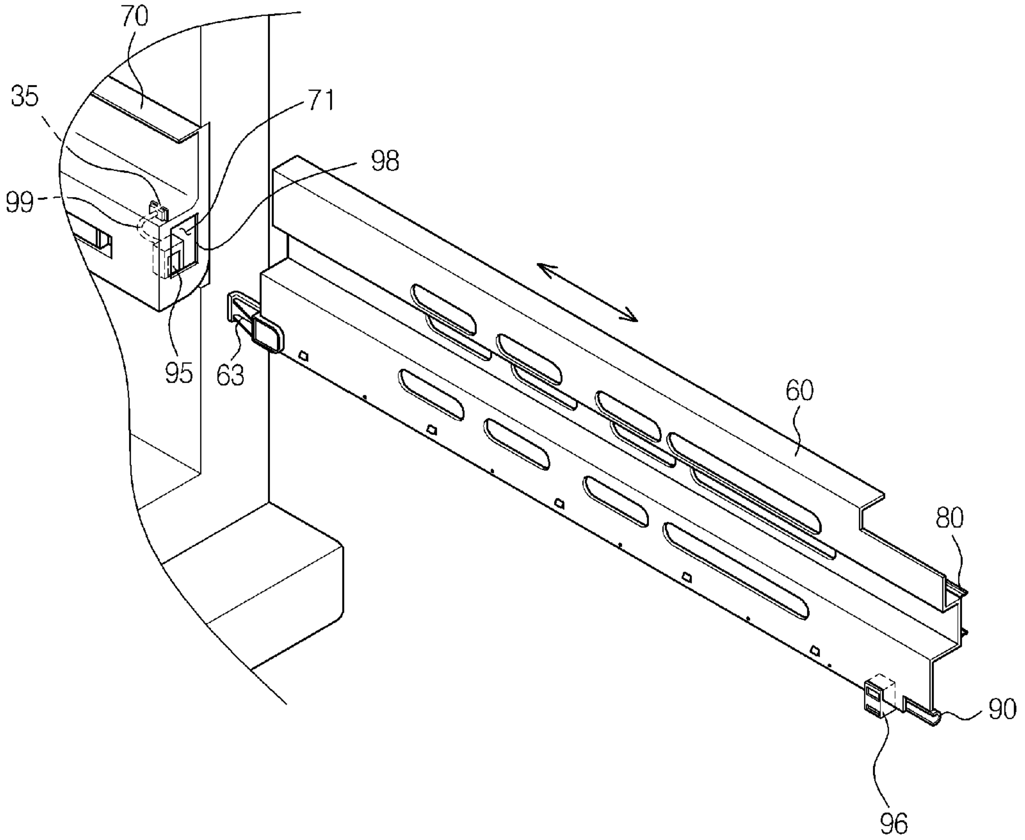
FIG. 13 is a view illustrating an opening and closing detection unit according to an embodiment.

FIG. 13 is a view illustrating an opening and closing detection unit according to an embodiment. Referring to FIG. 13, the opening and closing detection unit 95 and 96 may include a reed switch 95 disposed at the front end of the receiving space 71 of the corresponding fixed frame 70 and a magnet 96 disposed at the front of the lower end of the corresponding sliding frame 60.

The front end of the corresponding fixed frame 70 may be provided with an open switch hole 98, through which the reed switch 95 is exposed, and the reed switch 95 may be disposed in the receiving space 71 inside the switch hole 98.

Also, the reed switch 95 may be electrically connected to an electric wire 99 drawn from the electric wire drawing part 35 provided in the vicinity of the front end of the corresponding sidewall 33 of the freezing chamber 30. The reed switch 95 is connected to a controller (not shown) to transmit and receive an operation signal to and from the controller.

That is, when the freezing chamber door 41 is drawn with the result that the magnet 96 provided at the corresponding sliding frame 60 is placed in the vicinity of the reed switch 95, the reed switch 95 is operated, and the operation signal of the reed switch 95 is output to the controller.

The open or closed state of the freezing chamber door 41 is detected by the cooperation of the reed switch 95 and the magnet 96. The reed switch 95 is disposed adjacent to the electric wire drawing part 35, thereby reducing the length of the electric wire 99. Meanwhile, the electric wire 99 connected to the reed switch 95 is separately provided as shown in FIG. 13. Alternatively, the reed switch 95 may be electrically connected to the electric wire cable 50, which is connected to the control panel 45.

As is apparent from the above description, the electric wire cable connected to the control panel is prevented from being damaged upon sliding insertion and drawing of the freezing chamber door in the frontward-and-rearward direction of the refrigerator body, thereby improving reliability of the refrigerator.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A refrigerator comprising:

a storage chamber including an opening;

at least one wire configured to extend from an inside of the storage chamber to the opening;

a drawer type door configured to move out of and into the opening to thereby open and close the opening, respectively, and including a display configured to connect to the at least one wire;

a first frame configured to be mounted on an inner surface of the storage chamber, the first frame including a receiving space receiving a portion of the at least one wire and a guide groove formed to allow the at least one wire to pass therethrough;

a second frame configured to be mounted to the drawer type door;

a sliding unit coupleable to the first frame and the second frame between the first frame and the second frame so that while the sliding unit is coupled between the first frame and the second frame, the second frame is slidably moveable with respect to the first frame as the drawer type door is being moved into or out of the opening; and a wire housing coupleable to the second frame below the sliding unit so that while the wire housing is coupled to the second frame, a portion of the at least one wire is attachable to the wire housing while another portion of the at least one wire is moveable inside the wire housing as the second frame slidably moves, the wire housing having a guide part bent from an end of the wire housing toward the guide groove to be movable along the guide groove, wherein the at least one wire includes:

a first portion extending from the inner surface of the storage chamber;

a second portion accommodated in the wire housing; and a third portion provided between the first portion and the second portion to be deformed as the drawer type door moves, wherein the guide part is provided to guide the third portion of the at least one wire inside the receiving space through the guide groove.

2. The refrigerator of claim 1, wherein the at least one wire includes a connector configured to electrically connect and disconnect the at least one wire to the drawer type door.

3. The refrigerator of claim 2, wherein the connector is a first connector and the at least one wire includes a second connector configured to electrically connect and disconnect the at least one wire to the inside of the storage chamber.

4. The refrigerator of claim 2, further comprising a detachable cover configured to cover the connector.

5. The refrigerator of claim 1, wherein the at least one wire is configured to connect to a rear surface of the drawer type door, wherein a front surface of the drawer type door is configured to form an exterior surface of the refrigerator when the drawer type door is moved completely into the opening to close the opening.

6. The refrigerator of claim 1, wherein the second frame further includes a guide configured to guide the at least one wire into the second frame.

7. The refrigerator of claim 1, wherein the first frame further includes a protrusion configured to fix the at least one wire to the first frame.

8. The refrigerator of claim 1, further comprising a detachable storage basket configured to be supported by the second frame.

9. The refrigerator of claim 1, wherein the at least one wire is configured to form a loop in the first frame that changes in length as the drawer type door moves out of and into the opening.

10. The refrigerator of claim 1, wherein the storage chamber is configured to be a freezing compartment of the refrigerator.

* * * * *